May 1, 1945.  G. H. McCLELLAN  2,375,121
MOBILE TRAFFIC CONTROL SIGNAL DEVICE
Filed Dec. 7, 1942  2 Sheets-Sheet 1
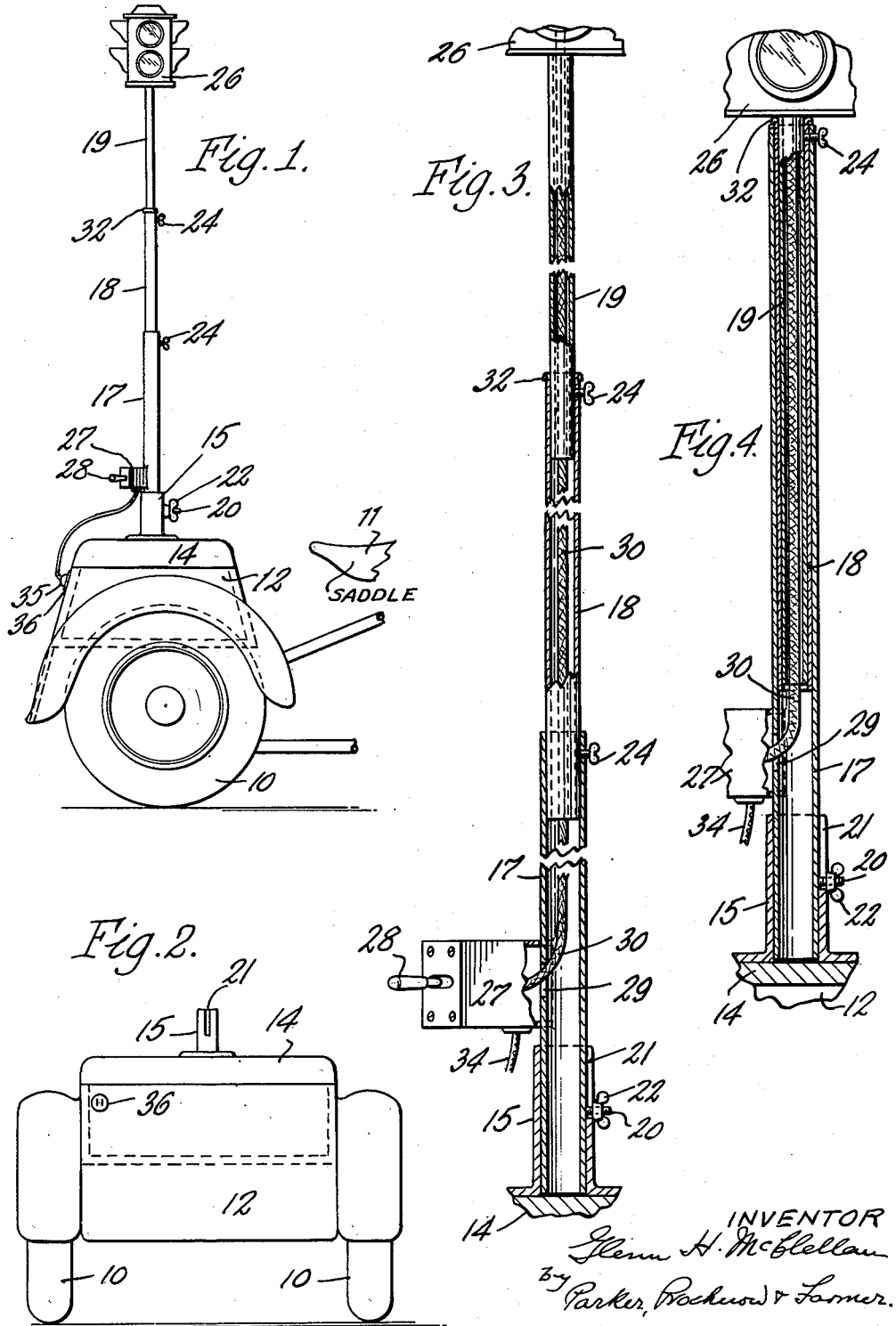

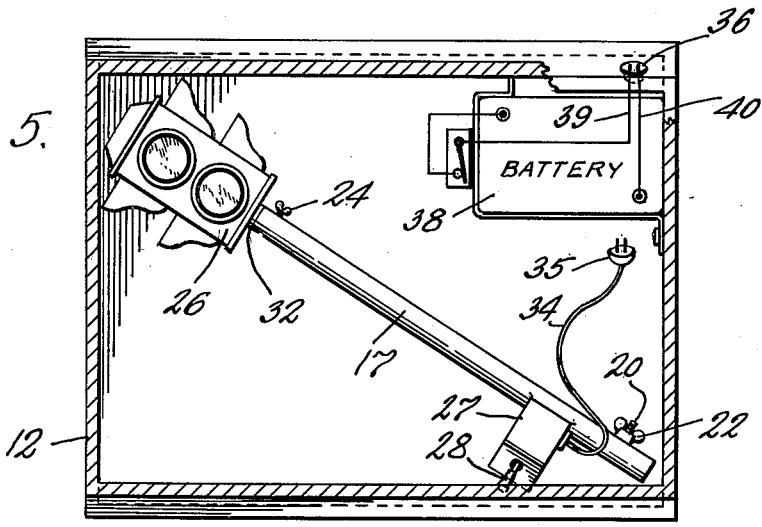
Fig. 5.
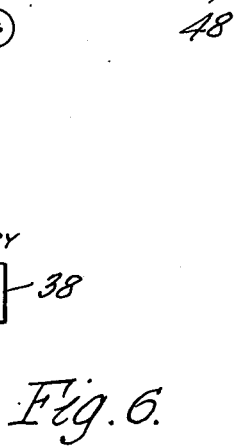
Fig. 7.
Fig. 6.

Patented May 1, 1945

2,375,121

UNITED STATES PATENT OFFICE 2,375,121

MOBILE TRAFFIC CONTROL SIGNAL DEVICE

Glenn H. McClellan, Buffalo, N. Y.

Application December 7, 1942, Serial No. 468,054

2 Claims. (Cl. 177—337)

This invention relates to traffic control signals of the type which may be mounted on vehicles for use whenever traffic conditions warrant. It frequently happens that on certain street or highway intersections, the normal traffic is not sufficient to warrant the permanent installation of a traffic signal, but at times, the traffic on such intersections may become so heavy that the temporary or occasional need for a signal device exists.

It is one of the objects of this invention to provide a traffic control signal device which may be quickly installed and easily operated at a highway intersection and then removed when the traffic subsides.

Another object of this invention is to provide a traffic control signal device which is so constructed that it may be carried in compact form in a vehicle and may be quickly installed or erected on the vehicle for use in directing traffic. Another object of this invention is to provide an electrically operated traffic signal device of improved and simplified form including a standard which is formed in sections having electrical conductors mounted thereon in such manner that no electrical connections need be made between the conductors of different sections when the signal device is being erected for use. It is also an object of this invention to provide a signal device formed in parts or sections of improved construction which can be quickly erected for use and collapsed to be placed in a trunk or container on the vehicle. Other objects and advantages of this invention will appear from the following description and claims.

In the accompanying drawings:

Fig. 1 is a side view of the rear portion of a vehicle having a signal device mounted in operative position thereon.

Fig. 2 is a rear view of the vehicle with the signal device removed.

Fig. 3 is a fragmentary elevation, partly in section and broken away, of a standard or post for a signal device embodying this invention, showing the parts in their operative positions.

Fig. 4 is a sectional elevation thereof showing the parts telescoped or in compact form.

Fig. 5 is a sectional plan view of a container mounted on the vehicle and showing the signal device in place therein.

Fig. 6 is a diagrammatic view of the electric wiring of the signal device.

Fig. 7 is a diagrammatic view of the switch for operating the signal device.

My improved signal device may be mounted on any suitable or desired type of vehicle, being shown in the drawings as mounted upon a motor driven tricycle of the type commonly used by police departments and including a pair of rear wheels 10, the front wheel and front portion of the tricycle being omitted from the drawings. The operator normally sits on the saddle 11, Fig. 1, and the tricycle has a box or container 12 mounted thereon between the rear wheels 10. The box has a removable cover or lid 14 which may form an additional seat.

Since it is desirable to mount the signal device so that the same will be as high as possible, my improved signal device is preferably mounted on the top or lid 14 of the box or trunk 12 and consequently, a suitable base 15 for the standard of the signal device may be rigidly secured to the top of the lid 14. This base in the construction shown includes a socket adapted to receive the lower end of the standard of the signal device.

The standard of the signal device is preferably made in sections, three such sections 17, 18 and 19 being shown, which may be releasably secured to each other in any suitable or desired manner so as to form an upright standard. These sections of the standard are also formed so that the standard may be collapsed into compact form for storage within the trunk or container 12. The lower section 17 of the standard may be provided with any suitable means for mounting the same in the base 15, and in the construction shown, a screw-threaded stud 20 is preferably secured to the lower portion of this section and is adapted to enter into a slot 21 in the base 15 and a thumb nut 22 may be tightened on this stud for holding the lower section in place on the standard. Any other suitable means may be employed for securing the lower end of the lowest section to a base.

In the particular construction illustrated by way of example, the three sections of the standard are of tubular form and are arranged telescopically so that the upper section 19 may enter into the intermediate section 18, and this intermediate section may enter into the upper end of the lower section 17. It will be understood, however, that the sections may be of any other suitable or desired form and may be releasably secured together by other means than those shown. Thumb screws 24 extend into threaded holes in the upper portions of the sections 17 and 18, and the inner ends of these thumb screws may engage the lower portions of the sections 18 and 19 when the standard is in operative or erected position, as shown in Fig. 3, for holding the sections in their extended positions.

The upper section 19 may have an illuminated traffic signal light or lamp unit 26 of any suitable type permanently mounted thereon and the lower section 17 may have a hand operated switch also permanently mounted thereon, the switch being arranged in a box or housing 27 and having an operating handle 28.

The switch 28 is connected to the signal light or lamp 26 by means of a series of conductors which are housed within the tubular sections of the standard. Any suitable or desirable conductors may be employed for this purpose, but preferably a cable 30 is employed of the extensible and contractible type, which are commonly used on telephone sets, in which the several conductors are so formed that the cable may be stretched or extended in length, and when the pull on the same is released, the cable will contract in length. When the parts of the standard are in their operative positions, the cable will be stretched to the required length as indicated in Fig. 3, and when the sections of the standard are in their telescoped or compacted positions, as shown in Fig. 4, the cable becomes contracted. Cables of this type are well known in the art and of themselves do not form a part of this invention and conductors of any other suitable type may be used, if desired. The conductors at one end of the cable are connected to the various lamp sockets in the signal light unit 26 and at their other ends to terminals in the switch box or housing 27. For this purpose, the lowest section 17 of the standard may be provided with an opening 29, Figs. 3 and 4, through which the cable enters the housing 27 of the switch, which is preferably permanently secured on the section 17.

When the parts of the column are in their telescoped or compact positions, for example, as shown in Fig. 4, the upper thumb screw 24 may be removed and the lower thumb screw may be inserted into the threaded hole for the upper thumb screw as shown in Fig. 4. Preferably the intermediate section is provided with a collar or flange 32 on the upper end thereof to limit the extent to which this section telescopes within the lower section 17. By releasing the lower thumb nut 22, the lowest section may be moved upwardly out of the base 15 and the standard and the parts mounted thereon may then be removed from the top of the lid 14. A cable or cord 34 carrying a pair of conductors extends from the interior of the switch box or housing 27 and terminates in a plug cap 35 which may be connected with a plug outlet 36 arranged on a wall of the box or trunk 12, the plug outlet 36 being connected with a battery or other source of power. When the plug cap 35 is pulled out of the plug outlet 36, the standard and parts mounted thereon may be inserted into the container or trunk 12 more or less diagonally to occupy the position shown in Fig. 5.

Any suitable means may be employed for supplying power to the signal light or lamp unit 26, and in the construction shown for this purpose, a storage battery 38 is provided which may also be mounted in the container or trunk 12, and the terminals of which are connected by means of conductors 39 and 40 of the plug outlet 36.

From the foregoing description, it will be obvious that the standard with the signal lamp and switch mounted thereon can be readily removed from the box or trunk 12 and mounted on the base 15 on the lid or cover 14. The sections may be slid relatively to each other and secured by means of the thumb screws 24 and by connecting the plug cap 35 with the plug outlet 36, the circuit is completed to the switch, so that the signal light may then be operated.

The circuits connecting the battery or other source of power with the lights arranged in the signal lamp unit 26 may be similar to those heretofore commonly employed in connection with permanently installed traffic control signal devices and are, therefore, not described in detail. The switch handle 28 shown by way of example in the drawings is pivoted at 42 on the switch box or housing 27 and has a rounded end portion 43, see Figs. 6 and 7, which may contact with either one of a pair of spring contact members 44 and 45. When the switch handle 28 is in the neutral or released position, as shown in Fig. 6, these spring contact members 44 and 45 which are connected with one of the conductors leading from the battery, contact with terminals 46 and 47 which lead to the four red lights on the four sides of the signal lamp unit 26 so that these will be illuminated. When the switch handle is moved into the position illustrated in Fig. 7, the spring member 45 will be moved out of engagement with the contact member 47 and into engagement with a contact member 48, thus causing two green lights on opposite sides of the signal lamp unit 26 to be illuminated. When the handle 28 is swung in the opposite direction from that shown in Fig. 7, the part 43 of the switch member will engage the spring member 44 and move the same out of engagement with the terminal 46 of one of the red light circuits and into engagement with another terminal 49 which is connected with the other two green lights of the signal lamp unit 26. Upon disengaging the spring contact member 45 for movement into engagement with the spring contact member 44, the spring member 45 moves back into engagement with the contact 47 so that the other two sides of the signal lamp unit 26 will again have the red lights illuminated. The lights are shown in Fig. 6, as they are arranged at opposite sides of the lamp unit 26, the red lights being marked "R" and the green lights "G."

By means of the signal device illustrated, motor vehicles used by traffic officers may be provided with signal devices which can be put into use quickly whenever needed, and which, when not in use, may be carried in compact form in a container or trunk so as not to interfere with other uses of the vehicle. When the signal device is to be used, the vehicle can be positioned at or near the middle portion of the intersection, and since the signal device is arranged at a considerable height above the average automobile, it serves very effectively in controlling traffic since it is more clearly visible than an officer standing at the street or highway intersection and attempting to direct traffic with his arms.

I claim as my invention:

1. A mobile traffic control signal device for use at street and road intersections, including an automotive vehicle having a container thereon, a standard formed in sections, means for securing the end portions of the sections together when the sections are arranged in extended positions, a traffic directing signal lamp unit mounted on the upper section, a base mounted on said vehicle and to which the lower end of said standard may be removably secured, an electric battery mounted on said vehicle, flexible conductors held in place by said sections and connected at one end to said signal lamp unit, a switch mounted on the lower portion of said standard above said base and to which the other ends of said flexible conductors are connected, said sections, when said securing means are released, being movable lengthwise into compact form of a length to permit them, together with said signal lamp unit and switch to be inserted into said container, and a flexible current conducting cord permanently connected to said switch and detachably connected electrically with said battery.

2. A mobile traffic control signal according to claim 1 characterized in that the base for the standard is mounted on the lid of the container.

GLENN H. McCLELLAN.